United States Patent
Zimmer et al.

[11] Patent Number: 5,767,860
[45] Date of Patent: Jun. 16, 1998

[54] DIGITAL MARK-MAKING METHOD

[75] Inventors: Mark Alan Zimmer; John Derry, both of Aptos, Calif.

[73] Assignee: MetaCreations, Corp., Carpinteria, Calif.

[21] Appl. No.: 568,957

[22] Filed: Dec. 7, 1995

Related U.S. Application Data

[63] Continuation-in-part of Ser. No. 325,962, Oct. 20, 1994, abandoned.
[51] Int. Cl.⁶ .................................................. G06F 15/00
[52] U.S. Cl. .................................................. 345/441
[58] Field of Search .................................. 345/433, 434, 345/118, 348, 349, 350, 441, 442, 443

[56] References Cited

U.S. PATENT DOCUMENTS

| | | | |
|---|---|---|---|
| 4,984,183 | 1/1991 | Ohuchi | 364/521 |
| 5,235,509 | 8/1993 | Mueller et al. | 364/405 |
| 5,287,440 | 2/1994 | Yamaashi et al. | 395/134 |
| 5,289,568 | 2/1994 | Hosoya et al. | 395/135 |
| 5,317,687 | 5/1994 | Torres | 395/159 |
| 5,367,626 | 11/1994 | Morioka et al. | 359/159 |
| 5,412,767 | 5/1995 | Long | 395/133 |
| 5,412,773 | 5/1995 | Carlucci et al. | 395/156 |
| 5,586,237 | 12/1996 | Baecker et al. | 395/133 |

*Primary Examiner*—Phu K. Nguyen
*Attorney, Agent, or Firm*—Jeffrey A. Hall

[57] ABSTRACT

A method to accurately create a multi-image mark-making tool so as to simulate digitally the rendering of a printed articulation, stroke, or mark of a donor natural medium used in graphic arts, such paints, pencils, erasers, or other implements. Using a computer or other hardware the method provides a digital representation of multiple-image elements to simulate an implement tip, receptor grain and variable grain penetration, and smooth and continuous brush stroke without visible artifacts. The method allows for isolating a plurality of image elements, masking the image elements, creating a grid of image elements to function as an index of an array of the image elements, creating a file of such image elements for the purpose of accurately simulating brushes and other donor-receptor articulations common to natural media, and for rendering a brush stroke in multiple-images to accurately simulate digitally paint brushes and other implements.

13 Claims, 2 Drawing Sheets

DIGITAL MARK-MAKING METHOD

RELATED APPLICATIONS

This is a continuation-in-part of Ser. No. 08/325,962 filed Oct. 20, 1994, now abandoned.

BACKGROUND OF THE INVENTION

1. Field of Invention

This invention relates to digital mark-making tools for electronic image processing systems. Specifically, this invention relates to a method to accurately simulate digitally the rendering of a printed articulation, stroke, or mark of a donor medium typically used in graphic arts, such as paint brushes, and the like, and to accurately execute realistic characteristics, if desired, similar to those achieved on receptor media such as watercolor paper surfaces, cotton bond paper, cold and hot press papers, and canvas.

2. Description of Related Art

Prior digital mark-making techniques of related methodologies for providing a digital mark-making tool have consisted of instruments where a bitmap pattern is defined as the brush tip which paints a specified pattern. Use of such pattern brush typically results in a paint stroke which simply tiles that pattern across the canvas, modulated by the edge opacity of the brush tip. Thus only single image or pattern can be used to define the tip of this brush and the strokes or artwork created by this tool is substantially uniform and unrealistic.

A related technique is the "image-stamping" brush method. Here, a single image is selected as the brush tip and this image is stamped or composited electronically onto the image as the brush tip moves over the canvas.

There are numerous other standard computer peripherals available that allow "computer graphics" to be generated electronically. Typically these take the form of vector or raster displays with the input means provided by some form of touch tablet on which the user can draw and see the results of such work in real time on an electronic display.

The use of high resolution optical scanners to generate electronic, continuous tone raster image signals to depict continuous tone originals such as graphic art work and photographs is also well known. Usually the raster image signals are used in electronic plate making equipment to modulate a scanning laser beam, an electronic beam in a cathode ray tube, or the like, to fashion a facsimile of the continuous tone original on an appropriate printing master. The content of the original must be in a final form before the scanner generates the raster signals because limitations in the means to for making changes to the electrical image like touch up work, corrections, or modifications of artwork by an artist.

Normally, an artist changes shading, changes tone levels, corrects or modifies color hue, and erases or smears small defects. An artist also varies the shape of the tip of the implement used to render various artist effects, as well as filling in details, erases regions, and otherwise changes and modifies the artistic work. Such image retouching, when done electronically, is provided by devices which can be manipulated as if it were a brush or other implement by an operator viewing a cathode ray tube or other type display, to make corrections, modifications, or erasures to an electrical raster image during real time interaction between the user and the displayed image.

Such memory devices store the electrical signals representative of an image sought to be corrected or modified.

The electrical image is made visible to an observer by providing the electrical signals to a display device. A brush tip image, for example, is created on the display over the visual image. The electrical brush usually includes a pointer device that is manipulated by the user to alter or touch up the continuous tone image. The pointer modifies the tone of the displayed image when it is moved in a brush like fashion and a button the pointer is depressed. Such movement of the pointer causes a like movement of the brush tip image. The motion and button depression allow the user to obtain image changes under the brush tip image with a stroking action which, with significant limitations, approaches that of an artist working on a painting.

In one well known embodiment, the pointer is activated by what is conventionally known as a mouse. The apparatus includes a ball bearing which is rolled over a surface to generate positive signals that move the image of the brush over the visual image on the display. The pointer may also include a plurality of buttons which are used to touch up images by simultaneously rolling the pointer over the surface and depressing one on the buttons to increase tone level of the signals in the memory corresponding to the signals in the region of the brush; to decrease the tone level image signals in the region of the brush; or to vary the size of the image of the brush tip when it depressed along with one of the other buttons. Numerous variations are available, such as hand held pointers, and varying the size or type of implement. Cursor and pointer devices are also well known in the prior art as well as systems and methods to modify rather than replace existing image data.

A fairly common application of digital techniques comprises an electronic graphics system with a touch tablet having a stylus, a computer, and a framestore with associated color generation capacity for the display. The user draws with the stylus of the touch tablet and the computer registers the coordinates (x, y) of the stylus while recalling the selected color with which the user has chosen to draw. The computer then provides the appropriate addresses to the framestore where the pixel at that address is modified to hold a pre-selected code corresponding the chosen color which it receives as incoming data. When the framestore is read at normal broadcast video rates then the lines, or illustrations drawn by the user are visible on the display.

It is also well known to generate color for display from RAM stores providing the blue, green or red components respectively to generate a desired color combination, where equal amounts of the red, green or blue (RGB) components will produce a monochrome image of a particular density. If data from the frame store is 8 bits wide, this allows for 256 different color combinations. The capacity for the RAMs is chosen accordingly. Various color parameters are directed into the RAMs from the computer and can be updated and varied as desired. Usually the RAMs are selected to operate as ROMs in dependence on the framestore generating output.

This type of system where the path from the touch tablet to the framestore and the display via the computer is all unidirectional, since the computer only writes from the framestore and does not read from it, and consequently makes no use of the information contained in the framestore. The quality of the product produced by such a system is significantly limited and is partially a result of the only 256 possible combinations in each pixel and therefore only 256 saturations, hues or luminance representations are possible on the screen for any given picture. To achieve a level of representation approaching "fine art" far more color combinations would be necessary.

Numerous prior art attempts to simulate painting tools and to improve on the quality of the graphic product exist. In broad terms, the field of image processing embraces the subcategories of image compositing and digital paint. Image-compositing may be broadly described as the process of collage, attempting to take a multitude of images from different sources and combining or integrating them in a natural and seamless manner on the computer. Digital paint programs have as a primary goal, the capability to realistically simulate natural media effects, such as oils, watercolors, pastels, and the like, on the computer. It is well known for image processing programs to include both digital paint effects and image compositing features in the same software. Prior software has included such features, however, there has been little if any integration between the two.

Several methodologies are used in image compositing to improve results. One such method is soft-edged masking. Soft-edged masks are used to insure that the edges of composited images combine in a photo-realistic manner. Usually soft-edged selections use anti-aliasing or feathering to achieve smooth compositing effects. Both methods are predicated on the ability to support 8-bit or higher masks. These masks allow the programs to set the transparency level for individual picture elements or pixels. The appropriate modulation of these transparency values is what produces the effect of smooth compositing between different images.

Multiple floating selections or multiple layers is another method used in image compositing. When producing an image as a collage of different individual images, it is advantageous to be able to keep the individual images as independent elements as long as possible, so they can be rearranged and adjusted at will. The first generation of image-editing programs only allowed a single element to remain "floating" at one time. this element would have to be "frozen" into the background before a second element could be brought in and repositioned. Multiple floating selection methodology allows any number of these image elements to be moved and repositioned at will until the time that the user decides to combine an element, or until the elements are composited for printing. multiple floating selection methodology, the soft-edged selection techniques described are typically used to insure seamless compositing of image elements.

Digital painting programs may use a few of the same algorithms as image compositing methods, but focus on the goal of electronically simulating the physical process of putting marks, such a oil paint, watercolors, charcoals, pencils, etc., on paper or canvas. The methods used in digital paint often use a source that that consists of a color or range of colors which is used to simulate the physical colorant. This digital ink is then modulated by the algorithms which model the physical application process and the mathematical model of the physical media on which the colorant is applied.

A significant difference between image compositing and digital paint methodologies is that digital paint is typically applied with digital tools (e.g. brushes, pencils, etc.) which act directly on the background canvas. Such methodology allows the artist to be expressive, that is to permit the hand and eye to capture and represent the artist's interpretation of their conception. Image-compositing techniques, in contrast, usually involve isolating different image elements, and combining them on a digital canvas. Unlike painting, which involves the constant flow of ink between marking device and canvas, with compositing image methods, elements are placed deliberately and systematically on the canvas in a cut-and-paste type of operation.

From an artistic point of view, the kinds of expression that these two techniques can create are visually quite different. Essentially, the difference is one between an original painting and a photo-montage; one capturing the flow of ink or paint on paper and the other a composition of photographic elements.

The present invention provides an improvement and enhancement of both of these prior image-editing methodologies allowing for a truly unique and superior method for digital rendering of a mark-making device, such as a paint brush, airbrush, pencil or the like.

SUMMARY OF THE INVENTION

In accordance with the present invention a method is provided for the digital creation of a multi-image paintbrush or other drawing implement. The present invention simulates digitally the rendering of a printed articulation to closely approximate by electronic analogy an artists tool in order that the user may manipulate a stylus so that results which appear on the display make it appear that he is working with a paint brush, pencil, felt pen, chalk, charcoal, crayon, eraser, or other implement. The method of the present invention utilizes a series of digital images as the digital brush tip or implement tip.

Accordingly, a method for creating a multi-image digital mark-making tool for two-dimensional image filed creation on a computer is provided, comprising: isolating all of a plurality of image elements, said image elements being selected for creation of a plurality of image arrays; said image arrays being selectively composited on a digital image field; masking each of said plurality of image elements so that only portions of the image elements which are selected to be visible remain unmasked; placing the plurality of image elements in a grid, allowing said grid to function as an index of the array of elements; and storing said plurality of image elements, thereby creating a file according to number and layout of said plurality of elements within the file and linking the index of the plurality of image arrays to the plurality of image elements.

The method of the present invention for creating a multi-image digital mark-making tool is applied using a computer or other hardware, comprising the steps of: loading said multi-image digital mark-making tool into a computer; imaging said plurality of image elements into memory, thereby creating an array index of each element; selecting a flow algorithm for determining an order of image elements selected from said array index; adjusting stroke parameters for determining stroke characteristics of said mark-making tool; implementing a stroke of said mark-making tool, selecting at each point along a stroke path as determined by a selected spacing of said stroke whether an image will be composited; evaluating physical stroke characteristics including velocity, angle, pressure, bearing, and penetration; adding stroke attributes to said flow algorithm thereby generating an array index into said plurality of arrays; and applying said array index to select an image to be composited.

The improved method of the present invention possess the advantage of providing extremely smooth brush strokes by a multiple-image digital paint brush allowing for image elements which are composited as if they were ink directly on canvas or other surface. The method of the present invention further allows the user to achieve realistic and unique strokes, opacity, paper grain penetration, dab placement, and the like. This improved method is accomplished in a two-dimensional image field, this field being a plurality of pixels, and being organized into a two-dimensional array, the dimensions being labeled x and y in accordance with mathematical convention.

There is also provided a new method a method for the user to use the digital multiple images to composite onto the receptor medium, such as canvas, paper, cloth or the like. The method of the present invention allows selected attributes such as random order or sequential order, or calculated attributes such as stroke velocity, direction, and pressure to be accurately controlled and manipulated.

The present invention further provides a means and method for a multi-image paintbrush comprising a digital marking tool for varying the shape of the tip of the brush or other implement across the length of the stroke, and for rendering accurate representation of such brush or other implement and other related donor-receptor articulations common to natural media. To achieve such representations multiple image creation digitally rendered by the digital brush tip of the present invention provide artistic representation vastly superior in quality to all prior techniques. Moreover, multiple strokes are achievable with the present invention to accurately represent artist tools such as a camel's hair brush and relating such strokes to one another in direction, pressure, and velocity.

Accordingly, to achieve these and other advantages, a method is provided for achieving continuous, unique, realistic brush strokes by the digital creation of a multi-image paintbrush allowing for compositing of these images onto the digital canvas or other receptor medium as the multi-image paintbrush is moved across it. Multiple-image arrays are provided by individually isolating and masking pictorial elements using standard image-editing techniques and then individual elements are selected and composited into the digital brush stroke by the method described herein.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

DETAILED DESCRIPTION OF THE PREFERRED EMBODIMENTS OF THE INVENTION

Figure 1:
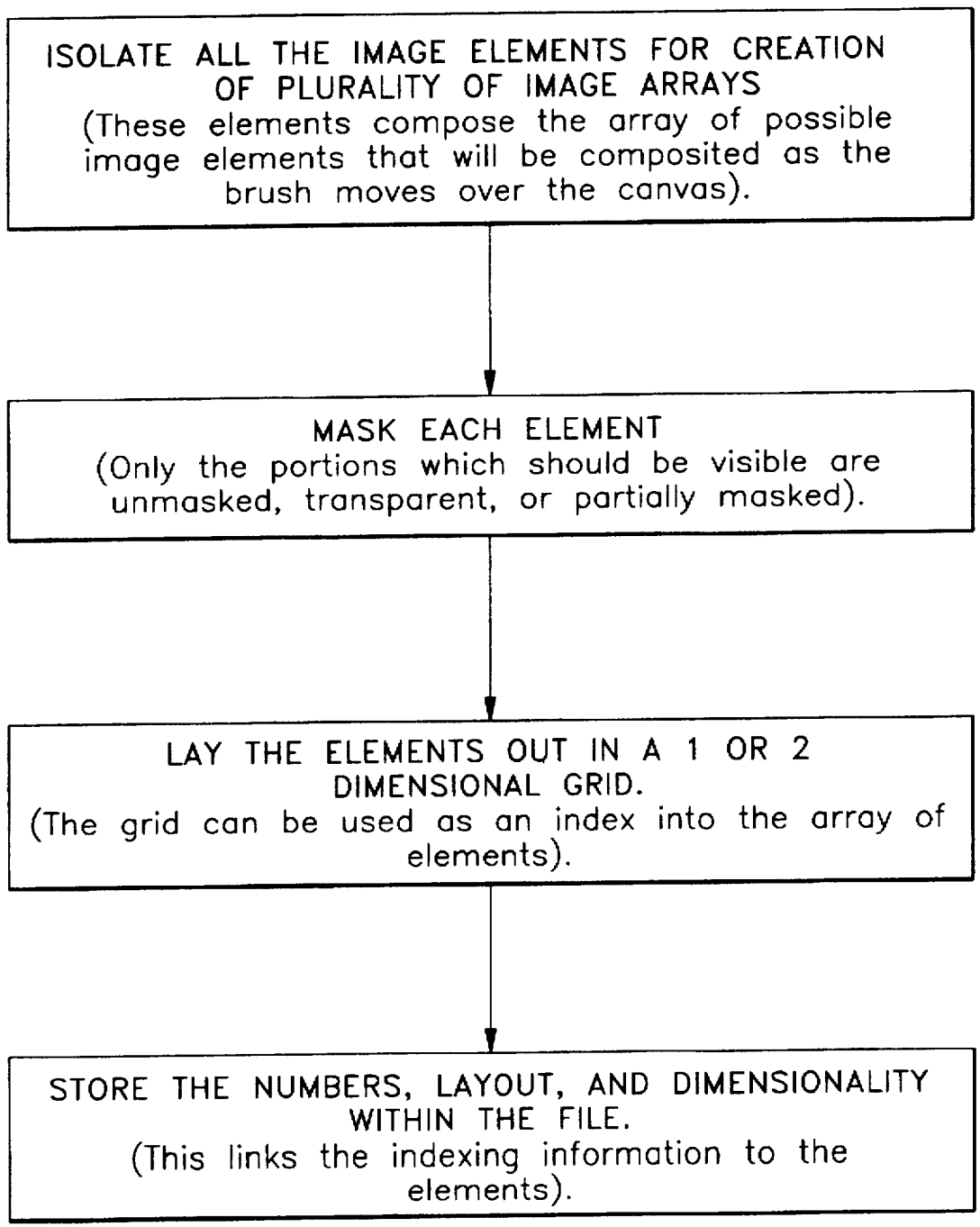
FIG. 1 is a flow chart showing a preferred sequence of steps comprising the method of providing a multi-image digital mark-making tool, according to the invention.

Reference will now be made in detail to the present preferred embodiments of the invention as illustrated in the accompanying drawings.

In accordance with the present invention, there is provided a method for creating a multi-image digital mark-making tool for two-dimensional image field creation on a computer, preferably comprising the steps of: isolating a plurality of image elements, said image elements being selected for creation of a plurality of image arrays; said image arrays being selectively composited on a digital image field; masking each of said plurality of image elements so that only portions of the image elements which are selected to be visible remain unmasked; placing the plurality of image elements in a grid, allowing said grid to function as an index layout of said plurality of image arrays; and storing said plurality of image elements, thereby creating a file according to number and layout of said plurality of image elements within the file.

In a preferred application of the method of the present invention, the method for creating a multi-image digital mark-making tool is applied using a computer or other hardware, comprising the steps of: loading said multi-image digital mark-making tool into a computer; imaging said plurality of image elements into memory, thereby creating and array index of each elements; selecting a flow algorithm for determining an order of image elements selected from said index array; adjusting stroke parameters for determining characteristics of said mark-making tool; implementing a stroke of said mark-making tool, selecting at each point along a stroke path as determined by a selected spacing of said stroke whether an image will be composited; evaluating physical stroke characteristics including velocity, angle, pressure, bearing, and penetration; adding stroke attributes to said flow algorithm thereby generating an array index into said plurality of arrays; and applying said array index to select an image to be composited.

The present invention uses a computer or other hardware to accurately create multi-image mark-making implements for the purpose of simulating digitally multi-element images such as photographs comprising multiple elements, for example, clover, money, tree branches, jelly beans, and other such multi-element images, and to simulate digitally the rendering of a printed articulation, stroke, or mark of a "donor" natural medium typically used in graphic arts, including oil paints using a brush, pencils, colored pencils, felt pens, markers, crayons, chalk, charcoal, erasers, bleach, and other tools onto a surface exhibiting grainy or uneven characteristics such as those "receptors" also typically used in natural graphic arts media, including cotton bond paper, watercolor paper surfaces, cold and hot press papers, and canvas.

The method of the present invention utilizes computer algorithms in combination with a computer or other hardware to simulate digitally printed articulation. To create accurate representations of multi-image brush strokes electronically the present invention isolates and composes arrays of image elements which will be composited as the paintbrush or implement moves over the receptor medium.

FIG. 1 is a flow chart illustrating a preferred embodiment of the method of the present invention to create and render a multi-image digital mark-making tool so as to accurately simulate digitally rendering of a printed articulation. In FIG. 1 the method is shown comprising the steps of isolating all of a plurality of image elements, which may be any type of pictorial, artistic, or natural elements and comprising an array of possible image elements that may be selected by the user and composited as the mark-making tool moves across a receptor surface. The elements are masked so that only selected portions which are to remain visible remain unmasked, transparent, or partially masked. The image elements are preferably placed or positioned in a one or two dimensional grid which may be used as an index into the array of image elements. The number and layout of the image elements are then stored within a file of the elements.

To accurately render multi- element images by laying down a random spacing of image element brush strokes or other marks and maintain an even consistency, opacity, and grain penetration of the brush stroke, the overlaying and positioning of the dabs within a stroke is programmed using a new method which is detailed here.

Figure 2:
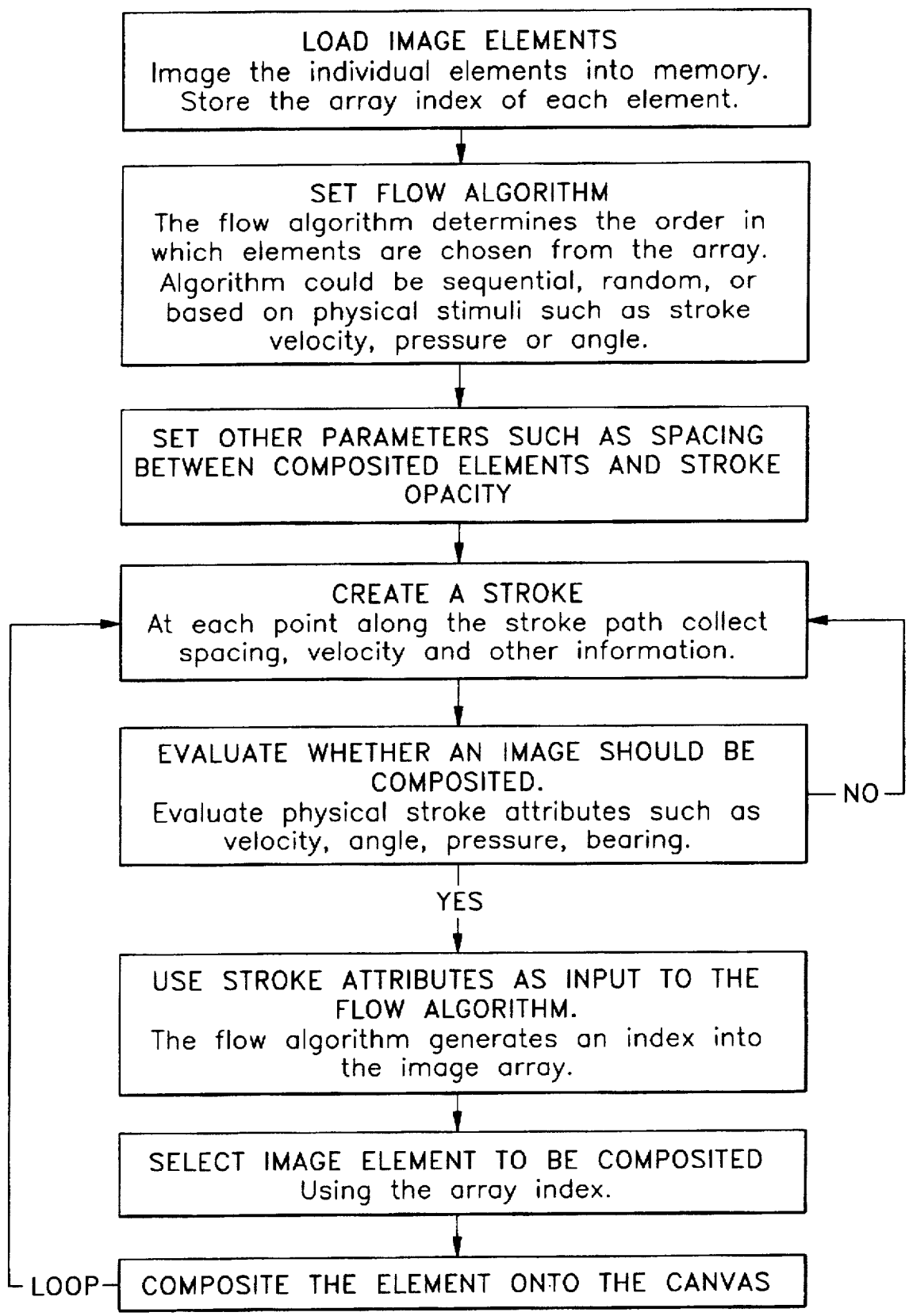
FIG. 2 is a flow chart which illustrates a preferred method for applying a multi-image digital mark-making tool for visual representation of the image on a display screen, according to the invention.

Referring to FIG. 2, a preferred method of applying the multi-image mark-making tool of the present invention is shown. First the program is loaded into the computer or other hardware and the individual image elements are imaged into the memory. The array index of each element is then stored, and a flow algorithm is chosen. The flow algorithm determines the order in which image elements are chosen from the array. Accordingly, the algorithm may be sequential, random, or based on various physical parameters such as direction, stroke velocity, pressure, angle, grain penetration, consistency, opacity, and the like.

Additional parameters are selected and set including spacing between composited image elements and stroke opacity. The user then creates a stroke at each point along a stroke path. the present methodology determines from the spacing, whether an image should be composited or not. According to the method of the present invention, if an image is to be composited, then physical stroke attributes such as velocity, angle, pressure, bearing, roll value and the like are determined. Of course, such stroke attributes will vary depending upon the particular application. The various stroke attributes are then input to the flow algorithm which then generates an index into the image array. The image array is then preferably used to select the image element to be composited. The image element may then be composited onto the receptor medium. Using this method, multiple image digital mark-making produces are truly unique and novel effect. This is because the present method uses a series of images or image elements to paint, color, draw etc. with, rather than a solid color or range of colors as conventionally applied.

Typically, a stroke or multiple image is sampled in time using a stylus or other locator which corresponds, in the user's hand, to a donor medium. A sample may consist of an image location in X and Y (preferably with greater accuracy than integer pixels), a pressure value P (which ranges from 0.0 to 1.0 inclusive), and optionally a tilt value (ranging between 0.0 and pi/2 radians inclusively), a bearing angle (ranging between 0.0 and 2*pi radians), and a roll angle (also ranging between 0.0 and 2*pi radians). The samples are preferably spaced at even time increments. Straight lines may then be drawn between the samples such that a continuous path is formed from the start to the end of the stroke. It should also be noted that interpolation is also done between the pressure, tilt, bearing, and roll samples as well, forming a continuous signal for these parameters along the stroke.

Stokes of the brush or other mark-making implement are placed along this path, according to their individual pressure, direction, tilt, bearing angle, and roll values. These ancillary values are used for the computation of grain penetration amount, opacity, brush size, dye concentration, and other values which can change along the stroke path. Like paint dabs, the discrete images can be configured to come off the end of the implement in a random or predictable fashion, and can be configured to be pressure sensitive, or can be made to vary with stroke direction or velocity.

Referring to FIGS. 1 and 2, the process of positioning a single image or multiple image of the brush stroke or other implement is illustrated. Initially, opacities are evaluated which correspond to the penetration into the grain of the dab and the concentration of the dyes used in rendering the dab.

These values are generally a function of real-time varying parameters such as pressure, velocity, bearing angle, tilt angle, and roll angle of the implement tip. For the current width of the brush stroke, a brush set is evaluated which most closely approximates this width. A dab is then placed at subpixel accuracy using rounding and truncation operations.

Further, the present invention may also, for example, represent color as RGB components. A critical distinction being that the color mixing functions are accomplished in a different color space. Therefore, color operations are calculated in dye-concentration space, a space which is much more natural for color mixing than RGB space. In the dye-concentration space, color is preferably represented by (1) the concentration of the cyan dye, (2) the concentration of the magenta dye, and (3) the concentration of the yellow dye. It is readily apparent, that such method and system differs in a non-trivial way from RGB color space for the purposes of color mixing.

In a case of laying down a wash of a dye onto a sheet of plain white paper, the density curves of the paper (which are usually very low values, since the paper appears to be white) are added to the density curves of the dye to produce the density curves of the dyed paper. In colorimetry, density curves are usually represented as a vector of density values for discrete bands within the electromagnetic spectrum. These bands are normally set between 400 nm (nanometers) and 700 nm, corresponding to the visible light spectrum.

For industrial dye work, 30 bands are usually used, at 10 nm increments. The density values are measured as the optical densities for each band. In other words, density (as used here) is the negative of the logarithm of the transmittance. This matches the common definition of optical density (as used by printers and other industries) and extends it for colorimetric purposes.

When rendering a paintbrush stroke, pencil, charcoal, chalk, or oil brush stroke, the donor medium interacts with the grain of the receptor medium. Prior art addressed the problem of the irregular edges of a brush stroke by introducing simple randomness into each picture element of the brush stroke. This method applies a multi-image application by isolating individual image elements and then creating an array of image elements to be composited as the brush or other implement moves across the receptor surface.

In the present invention, the ability to tie the order and choice of image elements which are composited is provided by user selected attributes such as random order or sequential order or elements, or may be composited according to calculated attributes such as stroke velocity, direction and pressure. When rendering strokes from any natural media donor, it is necessary to vary the size and shape of the donor's tip is response to pressure, velocity, and direction along the stroke. Preferably this is accomplished by pre-computing many different brush image elements and choosing the multiple image along the stroke. The present invention uses multiple image strokes with the brush size varied continuously along the slope as a function of pressure, velocity, direction, or some combination of the above parameters.

The paintbrush or other implement's size may be controlled by pressure so that, for example, harder pressures result in a larger brush width and a wider stroke and lighter pressures result in a smaller brush width and a thinner stroke. The brush size is may also controlled by velocity in a manner such that slower strokes result in a larger brush width and a wider stroke and faster strokes result in a smaller brush width and a thinner stroke. Controlling the brush size and image element size based on the direction of the stroke results in strokes which vary their width as a function of stroke direction. It should be noted that the pressure, velocity, and direction parameters are all real time parameters which vary along the stroke. Various parameters can be used to change brush shape and size. These real time parameters are related to the tilt, bearing angle, and roll angle of the stylus and correspond to the position of the tip of the donor medium with respect to receptor medium orientation.

While the present invention has been particularly described with reference to FIGS. 1-2, and with emphasis on the preferred embodiment of the invention, it should be understood that the figures and examples are for illustration only, and should not be construed as limitation upon the invention. In addition, it is clear the method and apparatus of the present invention, has utility in any application where graphic representations on a CRT or other display device are desired. It is contemplated that many modifications may be made by one of ordinary skill in the art, without departing from the spirit and scope of the invention as disclosed above.

What is claimed is:

1. A method for creating a multi-element image digital mark-making tool for two-dimensional image field creation on a computer to simulate digitally the rendering of a printed articulation to closely approximate by electronic analogy an artists tool, comprising the steps of:

isolating all of a plurality of image elements for creation of a plurality of image arrays; said image arrays being selectively composited on a digital image field;

masking each of said plurality of image elements so that only portions of the image elements which are selected to be visible remain unmasked, transparent, or partially masked;

placing the plurality of image elements in a grid, allowing an order of said elements within said grid to function as an index of the plurality of image arrays; and storing said plurality of image elements thereby creating a file according to number and layout of said plurality of image elements within the file, thereby linking said index of the plurality of image arrays to the plurality of image elements.

2. The method of claim 1, wherein said grid is a one-dimensional grid.

3. The method of claim 1, wherein said grid is a two-dimensional grid.

4. The method of claim 1, wherein said grid is a two-dimensional grid whose index is interpreted as an index into a three-dimensional array or higher dimensional array.

5. The method of claim 1 for creating a multi-element image digital mark-making tool using a computer, further comprising the steps of:

loading said multi-image digital mark making tool into a computer;

imaging said plurality of image elements into memory, thereby creating an array index of each element;

selecting a flow algorithm for determining an order of image elements selected from said array index;

adjusting stroke parameters for determining stroke characteristics of said mark-making tool;

implementing a stroke of said mark-making tool, selecting at each point along a stroke path as determined by a selected spacing of said stroke and offset by an optional random vector, whether an image will be composited;

evaluating physical stroke characteristics at each point along a stroke path including velocity, direction, angle, pressure, bearing, and penetration;

adding stroke attributes to said flow algorithm thereby generating an array index into said plurality of arrays; and applying said array index to select an image to be composited.

6. The method of claim 5, wherein said flow algorithm is sequential.

7. The method of claim 5, wherein said flow algorithm is based on direction.

8. The method of claim 5, wherein said flow algorithm is effected by any combination of direction, stroke velocity, angle, randomness, or pressure.

9. The method of claim 5, wherein said flow algorithm is random.

10. The method of claim 5, wherein said flow algorithm is based on stroke velocity.

11. The method of claim 5, wherein said flow algorithm is based on pressure.

12. The method of claim 5, wherein said flow algorithm is based on angle.

13. The method of claim 5, wherein said digital mark-making tool is a paintbrush.

* * * * *